J. DOYLE.
AUTOMATIC SERVING SYSTEM.
APPLICATION FILED JULY 11, 1911.

1,019,137.

Patented Mar. 5, 1912.

J. DOYLE.
AUTOMATIC SERVING SYSTEM.
APPLICATION FILED JULY 11, 1911.

1,019,137.

Patented Mar. 5, 1912.
7 SHEETS—SHEET 3.

WITNESSES

INVENTOR
James Doyle.
By J. N. Cooke
Attorney.

J. DOYLE.
AUTOMATIC SERVING SYSTEM.
APPLICATION FILED JULY 11, 1911.

1,019,137.

Patented Mar. 5, 1912.
7 SHEETS—SHEET 4.

J. DOYLE.
AUTOMATIC SERVING SYSTEM.
APPLICATION FILED JULY 11, 1911.

1,019,137.

Patented Mar. 5, 1912.
7 SHEETS—SHEET 5.

J. DOYLE.
AUTOMATIC SERVING SYSTEM.
APPLICATION FILED JULY 11, 1911.

1,019,137.

Patented Mar. 5, 1912.
7 SHEETS—SHEET 6.

WITNESSES
W. C. Cooke
W. Farnariss

INVENTOR
James Doyle,
By J. W. Cooke
Attorney.

J. DOYLE.
AUTOMATIC SERVING SYSTEM.
APPLICATION FILED JULY 11, 1911.

1,019,137.

Patented Mar. 5, 1912.
7 SHEETS—SHEET 7.

WITNESSES

INVENTOR
James Doyle,
By J. N. Cooke,
Attorney.

UNITED STATES PATENT OFFICE.

JAMES DOYLE, OF PITTSBURGH, PENNSYLVANIA, ASSIGNOR OF ONE-TWELFTH TO D. L. PELLER, ONE-TWELFTH TO JEREMIAH MOORE, AND ONE-TWELFTH TO ALEXANDER JENKINS, ALL OF PITTSBURGH, PENNSYLVANIA.

AUTOMATIC SERVING SYSTEM.

1,019,137. Specification of Letters Patent. Patented Mar. 5, 1912.

Application filed July 11, 1911. Serial No. 638,035.

*To all whom it may concern:*

Be it known that I, JAMES DOYLE, a resident of Pittsburgh, in the county of Allegheny and State of Pennsylvania, have invented a new and useful Improvement in Automatic Serving Systems; and I do hereby declare the following to be a full, clear, and exact description thereof.

My invention relates to automatic serving systems and has special reference to such a system that may be used in restaurants, hotels, etc., and will entirely eliminate the necessity of giving orders to, and receiving food from waiters as is the common practice, and will be quick and sure, and will tend to do away with the noise and confusion usually attendant in such dining rooms.

The object of my invention is to provide a cheap, simple, and efficient form of apparatus which can be easily and cheaply constructed, will be durable in all its working parts and will entirely eliminate the necessity of waiters in the dining rooms.

My invention consists, generally stated, in the novel arrangement, construction and combination of parts as hereinafter more specifically set forth and described and particularly pointed out in the claims.

To enable others skilled in the art to which my invention appertains to construct and use my improved automatic serving system, I will describe the same more fully, referring to the accompanying drawings, in which:—

Fig. 10 shows the method of transmitting the orders to the kitchen. Fig. 10$^a$ is a fragmentary section of lower portion of Fig. 10. Fig. 20 is an elevation of the server.

Like symbols of reference herein indicate like parts in each of the figures of the drawings.

Figure 1:
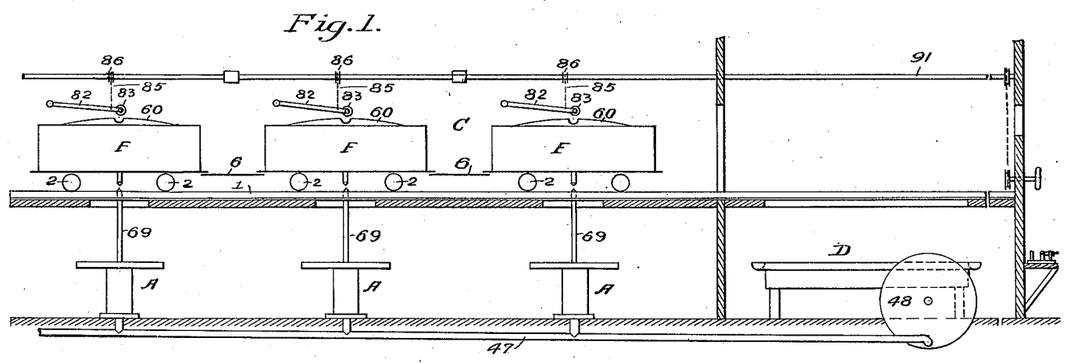
Figure 1 is a diagram showing general arrangement of the serving system.
Figure 2:
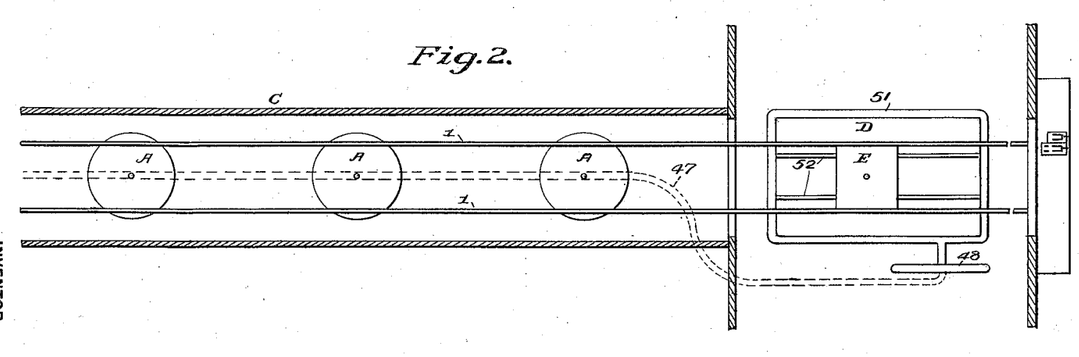
Fig. 2 is a diagrammatic plan view of the same.
Figure 3:
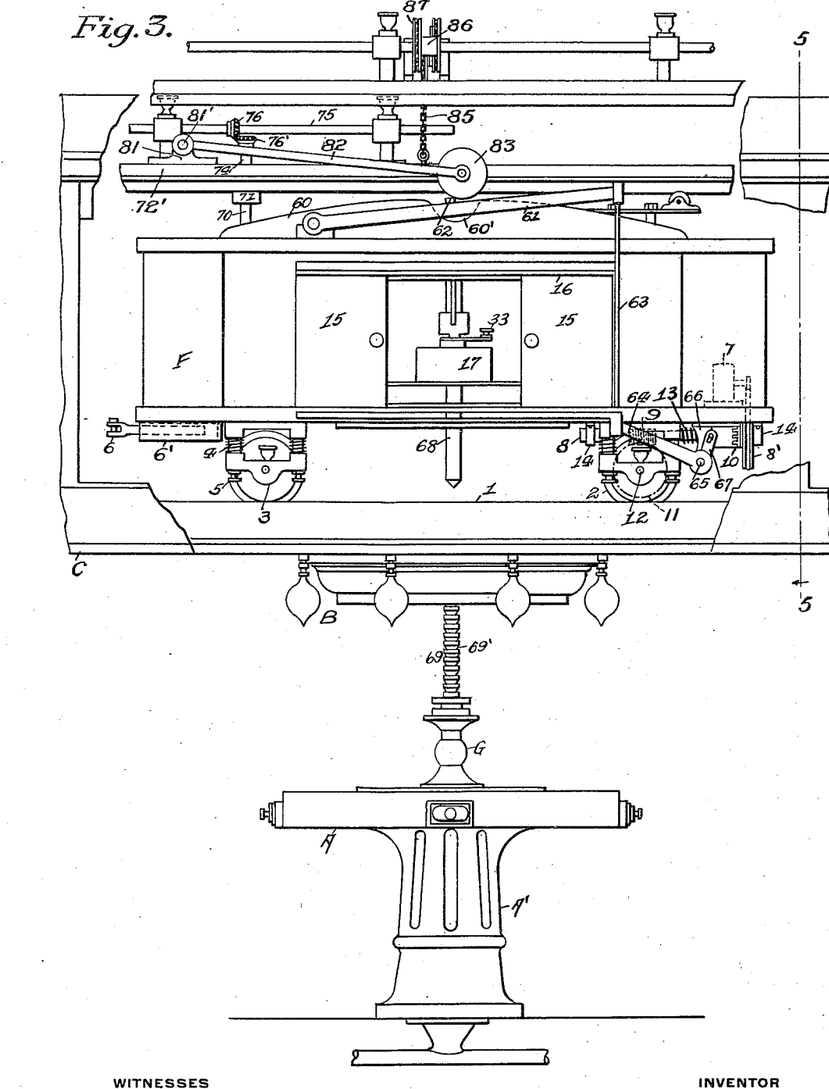
Fig. 3 is a view of one of the tables showing the cabinet above the same partly broken away to expose the car which carries the edibles.
Figure 4:
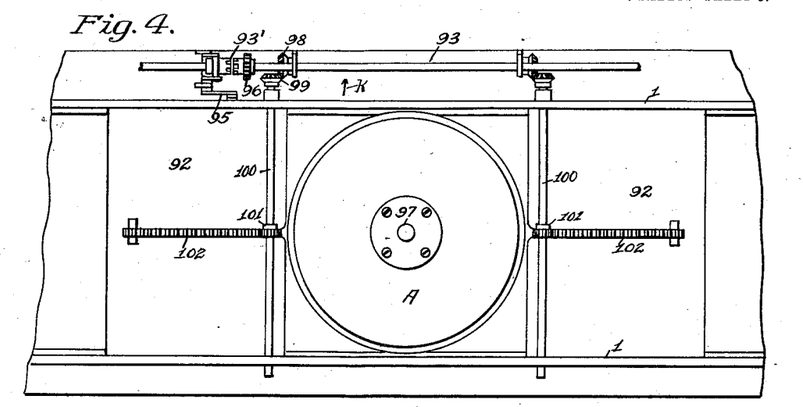
Fig. 4 is a plan view of a portion of the cabinet showing the rails for the cars.
Figure 5:
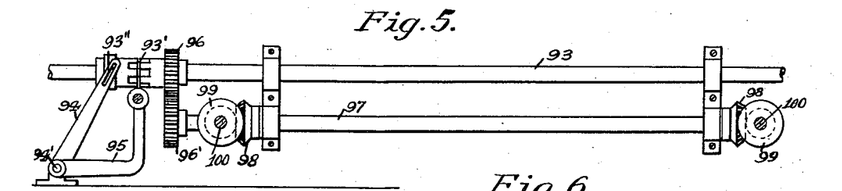
Fig. 5 is a side view of the gear arrangement looking in the direction of the arrow K in Fig. 4.

As illustrated in the drawings, A is one of a series of tables placed in rows in the ordinary manner of restaurants, hotels, etc., and is provided with a chandelier B above the same which is secured at its upper end to a cabinet C which extends above the tables A and is provided therein with rails or tracks 1 which as shown in Figs. 1 and 2 extend from the kitchen and the full length of such cabinet and provide for the transmission of the cars F in said cabinet by means of the wheels 2 on said car. The wheels 2 on the cars F are journaled in suitable housings 3, and such housings are mounted in the ordinary manner on spring 4, the tension of which is regulated by means of the screws 5 below the same.

Figure 7:
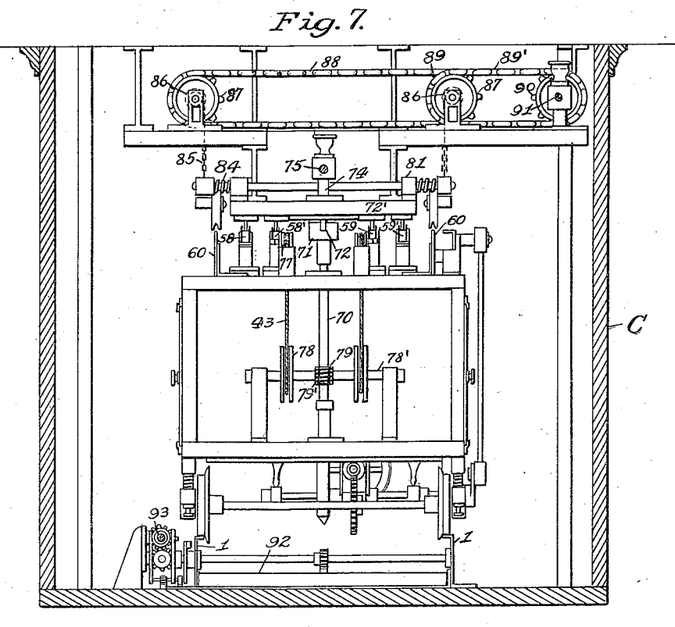
Fig. 7 is a sectional view of the cabinet on the line 5—5 Fig. 3, and shows the rear of the car and mechanism above the same.

The car F is provided at its forward end and at the bottom of the same with a coupling 6 which is adapted to be adjusted in length in its casing 6'. At the other end of the car is located the motor 7 which drives the shaft 8 by means of the pulley 8' mounted thereon and upon which there is a worm 9 and a clutch 10, said worm engaging with a worm gear 11 on the car axle 12 for driving the wheels 2 on said car. The shaft 8 is further provided with a spiral spring 13 around a portion of the same and such spring is adapted to keep the clutch 10 in close engagement when the car is being propelled through the cabinet C on the tracks 1. The shaft 8 is provided with suitable journals 14 at each end of the same to provide for the necessary rotation of said shaft therein.

The car F is provided on the sides of the same with sliding doors 15 which are adapted to be opened and closed and slide in the slide rails 16 on the sides of said car. Within the center of the car F is a small server 17 which has a circular opening 18 (Figs. 11 to 13) extending through the center of the same and such opening is larger in diameter at the bottom of the same, as at 18'. Upon the bottom of the server 17 is a metal plate 19 which is circular in shape and has the flange 19' extending upward within the center thereof and is secured to the body portion 20 of said server by means of screws 20' fitting into the same, while the top 21 of said body portion is tubular in shape and has the upper plate 22 and lower plate 23 fitting around the same.

Figure 11:
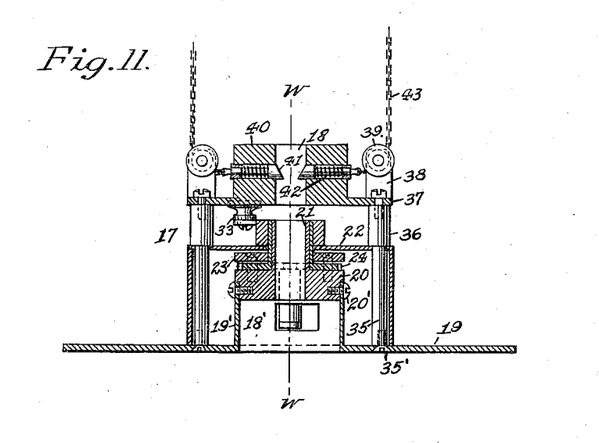
Fig. 11 is a vertical sectional view of the small server.
Figure 12:
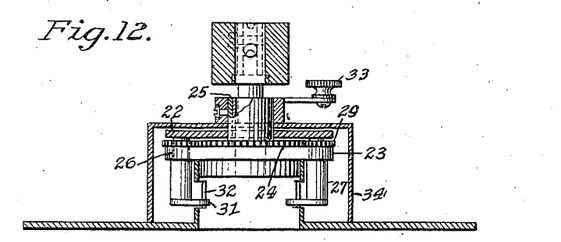
Fig. 12 is a vertical sectional view on the line W—W Fig. 11.
Figure 13:
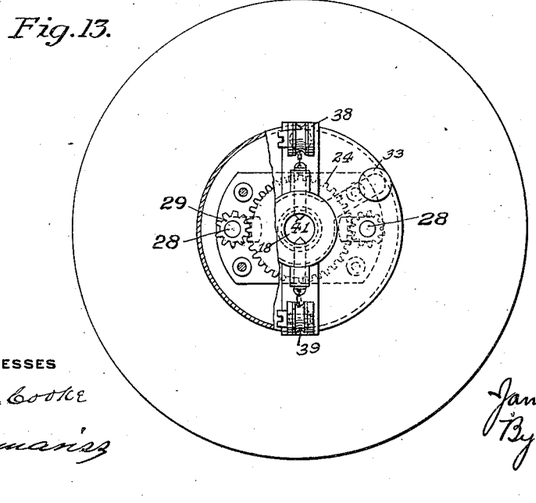
Fig. 13 is plan view partly in section of the parts shown in Figs. 11 and 12.
Figure 14:
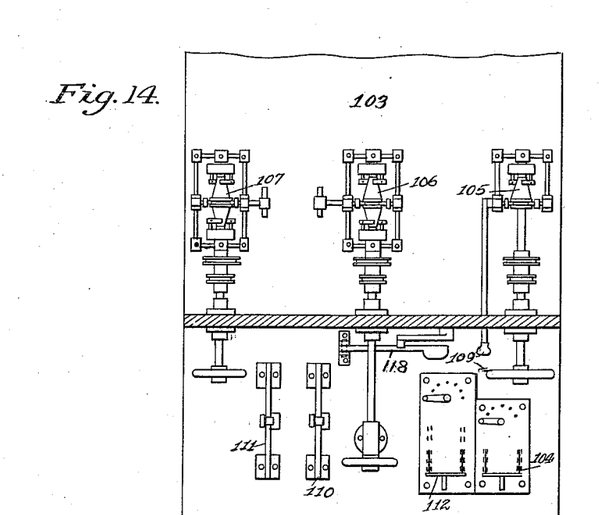
Fig. 14 is a plan view of the power transmitting system which is located in the kitchen.

Below the upper and lower plates 22 and 23, is a large gear 24 which has a tubular portion 25 fixedly secured to the same, and such tubular portion extends upward through the upper plate 22 and around the top 21 of the body portion 20 and said gear and tubular portion are rotatably mounted on such parts and are operated by means of a handle 33 secured thereto.

The bottom plate 23 is provided at each of the two ends of the same with a hole 26, and a tube 27 extends downward from such holes and a rod 28 fits into said hole and tube and is rotatably mounted therein, while the top of such rod is provided with a small gear 29 which meshes at all times with the large gear 24 below the plates 22 and 23, and the bottom of said rod is provided with a latch member 31 which extends outward therefrom and at right angles to said rod and is adapted to pass through openings 32 in the flange portion 19' for engaging with another server G, as hereinafter described.

Fitting over the body portion 20, and the gears and plates connecting therewith is a cover 34 which is secured to the metal plate 19 by means of two rods 35, which extend downward within said cover and are secured to said plate by means of screws 35' fitting through said cover and into the same, while the upper portion of said rods is enlarged by a shank portion 36 for resting against the top of said cover.

A plate 37 is adapted to rest upon the top of the shank portion 36 of the rods 35 and is secured thereto by screws passing through said plate and fitting into said shanks, while said plate is provided at each end of the same and directly above the shank portions 36 of the rods 35 with two parallel upright bars 38 which have a pulley 39 journaled between the same and at the upper end thereof. At the center of the plate 37 and fixedly secured thereto is a central portion 40 which has a tapered pin 41 extending out from each of the two sides of the same and in line with the pulleys 39 and each of said pins is adapted to extend into the circular opening 18, and is provided with a spiral spring 42 around the same for maintaining such in position; while a chain 43 is secured to the end of each of said pins and passes under and partially around the pulleys 39, as hereinafter described.

Figures 8, 17, 19:
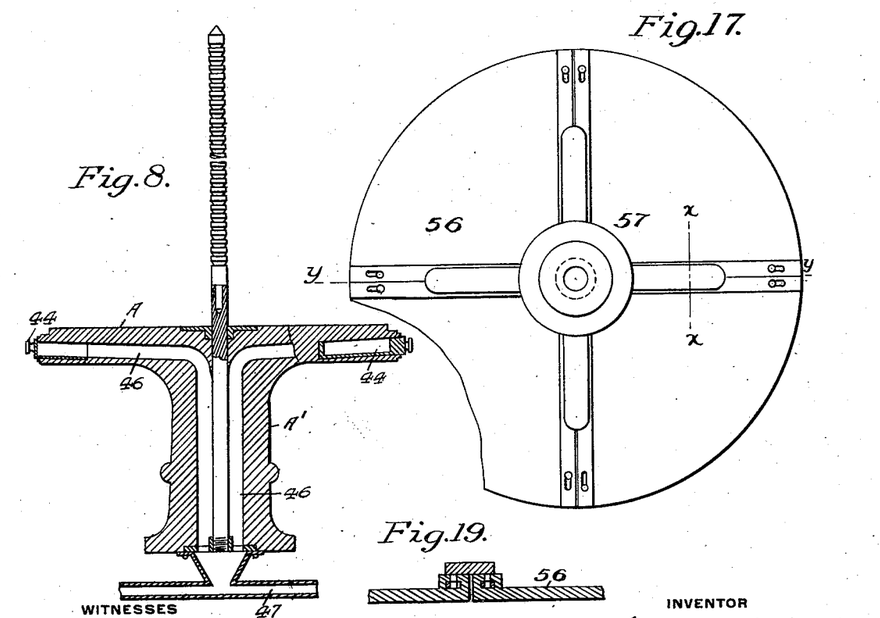
Fig. 8 is a central vertical section of the table employed and shows the arrangement for ordering food.
Fig. 17 is a plan view of a sectional server employed for serving the food.
Fig. 19 is a cross sectional view on the line X—X Fig. 17.
Figures 9, 18:
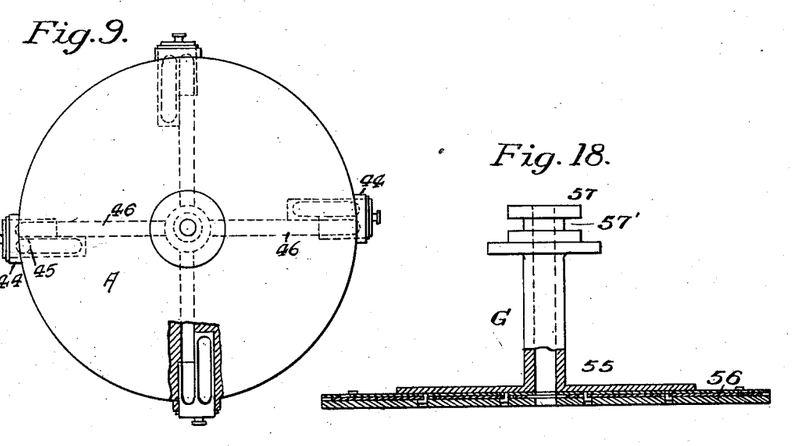
Fig. 9 is a plan view of the same.
Fig. 18 is a central sectional view of the same on the line Y—Y Fig. 17.
Figures 10, 10A, 20:
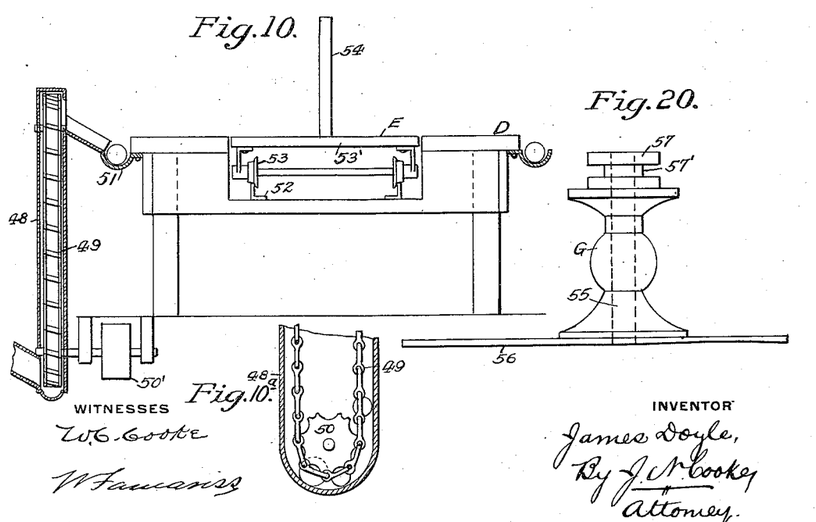

The table A in Figs. 8 and 9 is provided with a small drawer 44 at the several positions to be occupied by guests, and each drawer is adapted to contain hollow balls 45 for receiving the order of food filled out by the guest at such table and is also provided with a passageway 46 which is arranged at an incline and passes toward the center of the table, and thence downward through the supporting center A' of the same, and connects with a tube 47 which is inclined downward toward the kitchen, and such tube connects with a casing 48 in said kitchen, which has a chain 49 therein and such chain is carried by sprocket-wheels 50 in said casing, and each link of said chain is formed so as to receive one of the balls 45 and elevate the same to the trough 51 around the kitchen table D. The sprocket-wheels 50 carrying the chain 49 are adapted to be rotated by means of a pulley 50' located below the floor of said kitchen, and said pulley is rotated by means of a belt from any suitable source of power.

The kitchen table D is provided with rails or tracks 52, which are secured to said table, and small cars E are adapted to run along on said tracks by their wheels 53; while the body 53' of said car is provided with a round upright support 54, which is secured to the center of said body, and the servers G are adapted to fit over said support by their circular center 55.

The server G is provided at its lower end with the plate 56, which is circular in form and has suitable ornamental work above the same, at the top of which is a crown 57 which is provided with a circular groove 57' extending around the same, and such crown is adapted to fit into the enlarged opening 18' in the server 17 and to be held therein by means of the latches 31 which are caused to engage with said groove by the turning of the handle 33 on the tubular portion 25. The cars F are each provided with four pulleys 58, 58', 59 and 59', which engage with the trolley rods 58ª above the same, and said pulleys are mounted in a suitable manner on the top of said car and are adapted to be connected with the motor 7 by suitable wiring to provide for the operation of the same, and for the reversal of said motor to change the direction of said car, and said car also has an inclined plate 60 at each side of the top of the same, and each of such plates has a recess 60' at the center thereof; while a lever 61 is secured to the outer side of each of said plates and has a bar 62 extending between the same and above the recesses 60' in the plates 60. At the free ends of the levers 61 is a rod 63 which extends downward at the side of the car F and is pivotally mounted in a lever 64, and such lever is pivotally secured to a shaft 65, which is carried by a bracket 66. The shaft 65 also carries an arm 67 which is fastened to the forward end of the clutch 10 by means of a pin in the same fitting into a groove in said arm so that the clutch can be disengaged by the same being slidably mounted on the shaft 8.

Figure 6:
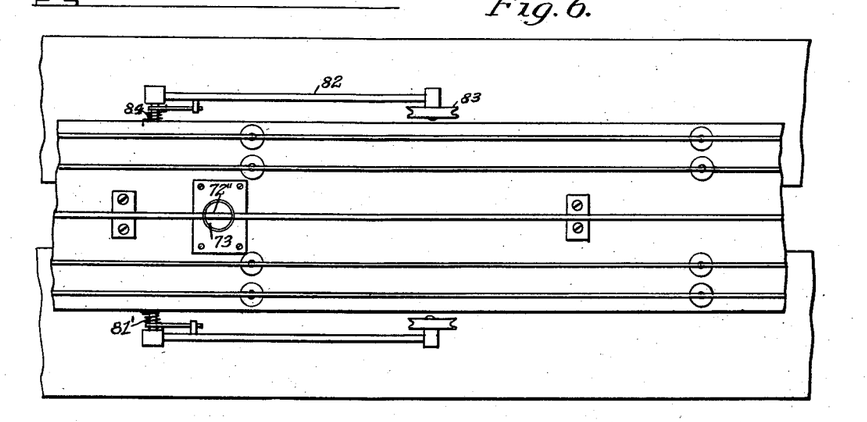
Fig. 6 is a view of the top of the cabinet immediately above the table.

Within the car F and secured to the top of the same at its central position is a rod 68 which extends downward through the small servers 17, and when the car has stopped in its position above the table A said rod will be in line with another rod 69, which extends upward from the top of said table at the center of the same, and is provided with notches 69' throughout its length for the purpose hereinafter explained. At the front end of the car F and inclosed therein is the apparatus for lowering the server on the table A from said car when the same has reached a position directly above said table, and such apparatus consists of a shaft 70, which has a grooved shank 71 at the upper end thereof for fitting into a rail 72 on the plate 72' of the cabinet C, and such rail extends throughout the length of said cabinet and is broken only above each of the tables A, at which point a revolving disk 73 in Fig. 6 is located, and such disk is also provided with a section of the rail 72'' and is mounted on a shaft 74 which extends upward from the plate 72' and engages with a line shaft 75, which extends the entire length of the cabinet C and into the kitchen, and such engagement is by means of the bevel gear 76 on said shaft and the bevel gear 76' on said line shaft.

Upon the top of the car F are the pulleys 77, which are adapted to receive the chains 43 extending upward from the sheave wheels 78 on the shaft 78' which is suitably mounted in said car, and at the center of said shaft is a worm gear 79 fixedly secured thereto, and said gear engages with a worm 79' on the upright shaft 70 for winding up or releasing the chains 43, one end of which is fixedly secured to said sheave wheels and said chains extend over the pulleys 77 and over pulleys 80, and thence downward and under the pulleys 39, and are connected with the pins 41 in the server 17 as before described.

Mounted in suitable supports 81 above each of the tables A and on the plate 72' is a shaft 81' which has a long lever 82 on each end of the same, and said lever carries a pulley 83 at the free end thereof, said pulleys being directly above the plates 60 on the top of the car F. Between the lever 82 and the supports 81 is a spiral spring 84 which fits around the shaft 81' and is adapted to hold said lever in a lowered position when desired. Chains 85 connect with the levers 82 and are adapted to extend upward and are fastened to small pulleys 86 which are mounted on sprocket-wheels 87 and connected between the same by a chain 88, while a sprocket 89 is also connected to one of said pulleys and connects by a chain 89' with a sprocket 90, which is mounted on a shaft 91, and such shaft extends throughout the length of the cabinet C and into the kitchen.

Within the cabinet C and above each of the tables A is located a pair of sliding doors 92, which are adapted to be opened at the proper time to allow the server G to be lowered on table A, and such doors are automatically closed when the car has passed from above said table, and this operation is accomplished by means of a shaft 93 which is suitably journaled in the cabinet C and extends the entire length thereof, and such shaft is provided with a clutch 93' which has the one end thereof fixed by means of a slotted hole 93'' to a lever 94 which is mounted on a small shaft 94', while an arm 95 is also fixed to said small shaft and is adapted to operate the clutch 93' as hereinafter described.

The loose end of the clutch 93' is provided with a spur gear 96 securely fixed thereon and meshes with a spur gear 96' on a shaft 97 below the same, and such shaft is provided at suitable points with two bevel gears 98, which mesh with bevel gears 99 on the shafts 100. The shafts 100 are journaled in the rails 1 on each outer side of the doors 92 and are provided with a spur gear 101 which is adapted to engage with racks 102 on the doors 92.

Figure 15:
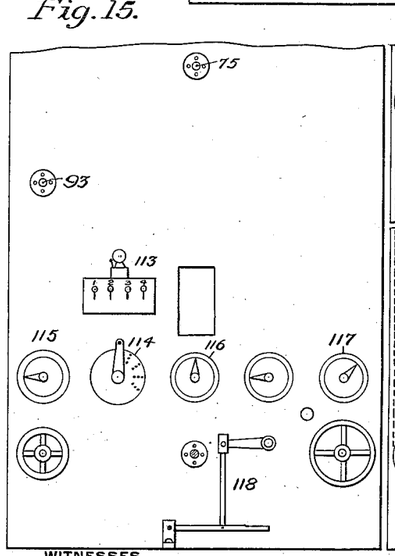
Fig. 15 is a front view of the operating board.
Figure 16:
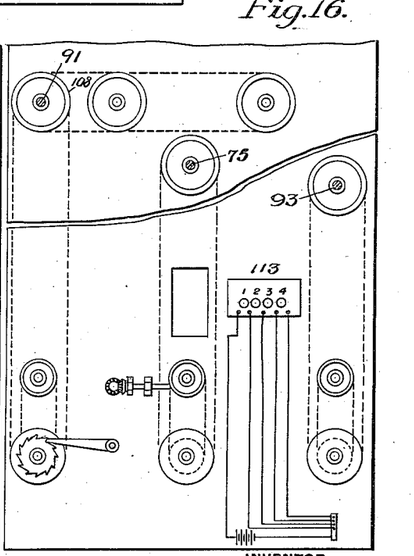
Fig. 16 is a rear view of the same.

The operating board 103 which is located in the operating room directly back of the kitchen is provided with a switch 104, which is adapted to start the three friction clutches 105, 106 and 107 in motion, and said first named clutch is adapted to be engaged with the shaft 91 by means of a belt connecting the same with a pulley 108 thereon, and said shaft can be rotated by operating the handle 109 to cause the friction clutch 105 to turn said shaft. The friction clutch 106 is adapted to cause the shaft 75 to be rotated so that the revolving disk 73 will thus be revolved and will allow the servers to be lowered or raised from the tables, and such operation will be accomplished by means of the switch 110 which engages said clutch and causes said shaft to rotate.

The friction clutch 107 is adapted to cause the doors 92 above the table A to be opened and closed at the proper times by means of the shaft 93, and is operated by means of the switch 111 which engages said clutch and causes said shaft to revolve. Each of the shafts bearing the clutches 105, 106 and 107 is provided with two pulleys, and one of such pulleys carries a straight belt; while the other carries a crossed belt which provided for the rotation of the shafts 75, 91 and 93 in different directions.

The switch 112 is of the double pole, double throw type and is adapted to change the direction of the current in the fields of the motors 7 in the cars F, and thus provide for the return of the same to the kitchen on the rails 1 in the cabinet C.

The small switch board 113 is arranged so as to indicate the position of the cars in the cabinet and may be adjusted by means of the switch 114 so that the operator of the system will always know when the car has reached its destination above the desired table.

The indicators 115, 116 and 117 indicate the position of the server 17, the condition of the doors 92 and the position of the levers 82, respectively, and are connected with the respective operating shafts by means of suitable chains adapted to operate the same. The foot switch 118 is for the purpose of lowering the levers 82 to thus stop the car F above the table and is connected with the clutch 105 which operates the shaft 91 and thus provides for instantaneous operation.

The operation of my improved serving system is as follows:—The guest is seated at the table A in the usual manner and such table is provided with a pad having the names of the different foods thereon, which the guest checks as he desires and then draws the small drawer 44 outward and withdraws one of the hollow balls 45 into which he places his order. The ball is then dropped into the passageway 46, and such passageway being at an incline said ball will roll toward the center of said table and down into the tube 47, whence it passes to the kitchen and enters the casing 48 and is elevated by means of the chain 49 until it drops into the trough 51 around the kitchen table D. The cook then opens the ball 45 and proceeds to fill the order contained therein, placing the dishes on the server G which is located on the small car E. After the dishes are placed on the server G the large car F which is located in the cabinet C directly above the kitchen table D is brought to a point above the small car E and the switch 110 thrown so as to cause the friction clutch 106 to operate the shaft 75, which will allow the small server 17 to be lowered by means of the chains 43 so that the enlarged opening 18' in the small server 17 fits over the crown portion 57 of the large server G and the party filling the orders turns the handle 33, which is secured to the tubular portion 25, said tubular portion being fastened to the large gear 24, so that when such handle is turned said gear will turn rotating the small gears 29 on each side of the same and in turn revolving the rods 28, so that the latches 31 are turned into the interior of the enlarged opening 18' and fit into the circular groove 57' in the crown 57 of the server G and thus connect said servers together. The servers are now raised in the reverse manner to that specified above, and the car is now ready for transmission into the dining room. Only one car in each train is provided with a motor therein, as the cars are all drawn by the one carrying the motor 7 and are connected together by means of the couplings 6, and in case any particular table is desired to be omitted and not served a long bar is placed between the cars to take up the space usually occupied by said car.

When the cars F are ready for passing into the dining room the switch board 113 is set so as to indicate when the car is approaching the desired forward table, after which the switch 112 is thrown in so as to start the motor 7 therein, which operates the pulley 8' on the shaft 8, which has a worm 9 thereon for engaging with a worm gear 11 on the axle 12 for propelling said car. When the car is reaching its destination and has passed the table preceding the one at which it is intended to stop the same, the shaft 91 in the cabinet C is rotated by means of throwing in the clutch 105, thus causing the sprocket-wheels 87, 89 and 90 to rotate, releasing the chain 85, which will allow the lever 82 to be swung downward by the spring 84 so that the pulleys 83 will engage by their grooved faces with the inclined plates 60. As the pulleys 83 are inclined on the plates 60 the car will be slowed down until the pulleys fall into the recess 60', at which time they will strike the bar 62 which is fastened between the levers 61, and push the same downward. As the levers 61 are thus forced downward the rods 63 connecting with the same will force the levers 64 downward and thus draw forward the arm 67, which will open the clutch 10, and thus stop any further propelling of the car F on the tracks 1. The operator may now stop the motor 7 by throwing out the switch 112 or may allow the same to continue in motion. The car is now directly above the table to be served, and the doors 92 have been opened by means of the car pressing down the arm 95 on the shaft 94' so that the clutch 93' is engaged by means of the lever 94, and the spur gear 96 on the shaft 93 is caused to rotate, thereby rotating the spur gear 96' on the shaft 97. As the shaft 97 is thus revolved the bevel gears 98 thereon will revolve the bevel gears 99 on the shafts 100, thus causing the spur gears thereon to draw the doors 92 apart by means of their engagement with the racks 102 on said doors.

The rod 68 which extends through the circular opening 18 of the server 17 is now directly above the rod 69, so that when the servers are lowered they may pass from the upper rod 68 and onto the lower rod 69 to be lowered to the table A. This operation is accomplished as follows: The grooved shank 71 which runs along on the rail 72 has now come into engagement with the section of the rail 72″ on the disk 73, so that when the clutch 106 is thrown in by means of the switch 110 the shaft 75 will be caused to rotate and the bevel gear on said shaft will cause the small shaft 74 to be rotated by means of its engagement with the bevel gear 76′ on the last named shaft, thus rotating the disk 73 and the shaft 70, which carries the shank portion 71. The shaft 70 which has the worm 79′ thereon by its rotation revolves the shaft 78′ by means of a worm gear 79 thereon engaging with the worm 79′ on the shaft 70, and thus rotates the sheave wheels 78 on the shaft 78′. The rotation of the sheave wheels 78 on the shaft 78′ releases or unrolls the chains 43, which pass over the pulleys 77 and the pulleys 80, and thence downward and under the pulleys 39, and connect with the pins 41 in the server 17 and allow said server to be lowered thereby on the rods 68 and 69. The weight of the server on the chains 43 will draw the pins 41 outward in the server 17 and place tension on the springs 42 so that if any accident should happen, such as the breaking of either of such chains, the spiral spring 42 will force the tapered pin 41 inward so that the same will catch on the notches 69′ on the rod 69, and thus prevent the server from dropping onto the table A and spilling the contents of the dishes placed thereon.

When the server G which is secured to the bottom of the small server 17, as described above, has been lowered to the table, the man in charge of the dining room will turn the handle 33, which will rotate the large gear 24, and thus rotate the small gears 29 and rods 28, thus turning the latches 31 around and out of the grooves 57′ in the crown 57 of the server G. Upon a signal from the man in the dining room to the operator the clutch 106 may now be reversed so that the shaft 75 will rotate in the opposite direction and the sheave wheels 78 on the shaft 78′ will roll or wind up the chains 43 thereon and thus raise the server 17 to its original position in the car F. The car F is now ready for its return trip to the kitchen. First the handle 109 is operated to raise the levers 82 by means of the shaft 91, as before described, and the pulleys 83 on the free end of said levers are raised from the recesses 60′. The switch 112 is now thrown in the opposite direction from its original position when the car was leaving the kitchen, and such operation will tend to reverse the field current of the motor 7 by means of the trolley rail 58, 58′, 59 and 59′, so that the motor will be reversed in the direction of rotation and as the lever 82 is raised the bar 62 on the lever 61 will be released so that the clutch 10 on the small shaft 8 will again be engaged as before described, and the car will start on its return trip to the kitchen. The small cars E on the kitchen table D may be used for conveying different articles in the kitchen and may also be used to convey the dirty dishes from the kitchen to the place where they are washed ready for use again.

It will thus be seen that my invention is very simple in construction and can be operated with very little cost and will entirely eliminate the necessity of having waiters in the dining room.

What I claim as my invention and desire to secure by Letters Patent is—

1. The combination of an overhead cabinet having tables beneath the same, rails within said cabinet, and means traveling on said rails and within said cabinet for conveying edibles from the place of preparing the same and for lowering the same onto said tables.

2. The combination of an overhead cabinet having tables beneath the same, rails within said cabinet, and cars traveling on said rails and within said cabinet for conveying edibles from the place of preparing the same and for lowering the same onto said tables.

3. The combination of an overhead cabinet having tables beneath the same, rails within said cabinet, cars upon said rails and within said cabinet for conveying edibles from the place of preparing the same, and an adjustable means within said car for carrying said edibles and adapted to be lowered onto said table.

4. The combination of an overhead cabinet having tables beneath the same, rails within said cabinet, cars upon said rails and within said cabinet for conveying edibles from the place of preparing the same, and an adjustable tray within said car for carrying said edibles and adapted to be lowered onto said table.

5. The combination of an overhead cabinet having tables beneath the same, rails within said cabinet, cars traveling on said rails and within said cabinet for conveying edibles from the place of preparing the same, an adjustable tray within said car for carrying said edibles, and means connected to said tray for lowering the same onto said table.

6. The combination of an overhead cabinet having tables beneath the same, rails within said cabinet, cars upon said rails and within said cabinet having means therein for propelling the same for conveying edibles from the place of preparing the same, an adjustable tray within said car for carrying said edibles, and means for lowering the same onto said tables.

7. The combination of an overhead cabinet having tables beneath the same, means within said cabinet for conveying edibles from the place of preparing the same and for lowering the same onto said table, and doors above each of said tables and in the bottom of said cabinet adapted to automatically open and close to permit the edibles to be lowered onto said tables.

8. The combination of an overhead cabinet having tables beneath the same, rails within said cabinet, means traveling on said rails for conveying edibles from the place of preparing the same and for lowering the same onto said tables, and doors above each of said tables and in the bottom of said cabinet adapted to automatically open and close to permit the edibles to be lowered onto said tables.

9. The combination of an overhead cabinet having tables beneath the same, rails within said cabinet, cars traveling on said rails for conveying edibles from the place of preparing the same and for lowering the same onto said tables, and doors above each of said tables and in the bottom of said cabinet adapted to automatically open and close to permit the edibles to be lowered onto said tables.

10. The combination of an overhead cabinet having tables beneath the same, rails within said cabinet, cars upon said rails for conveying edibles from the place of preparing the same, an adjustable means within said car for carrying said edibles and adapted to be lowered onto said tables, and doors above each of said tables and in the bottom of said cabinet adapted to automatically open and close to permit the edibles to be lowered onto said tables.

11. The combination of an overhead cabinet having tables beneath the same, rails within said cabinet, cars upon said rails for conveying edibles from the place of preparing the same, an adjustable tray within said car for carrying said edibles and adapted to be lowered onto said tables, and doors above each of said tables and in the bottom of said cabinet adapted to automatically open and close to permit the edibles to be lowered onto said tables.

12. The combination of an overhead cabinet having tables beneath the same, rails within said cabinet, cars traveling on said rails for conveying edibles from the place of preparing the same, an adjustable tray within said car for carrying said edibles, means connected to said tray for lowering the same onto said tables, and doors above each of said tables and in the bottom of said cabinet adapted to automatically open and close to permit the edibles to be lowered onto said tables.

13. The combination of an overhead cabinet having tables beneath the same, rails within said cabinet, cars upon said rails having means therein for propelling the same for conveying edibles from the place of preparing the same, an adjustable tray within said car for carrying said edibles, means for lowering the same onto said tables, and doors above each of said tables and in the bottom of said cabinet adapted to automatically open and close to permit the edibles to be lowered onto said tables.

14. The combination of an overhead cabinet having tables beneath the same, cars within said cabinet for conveying edibles from the place of preparing the same, and means within said cabinet for engaging with said cars for stopping the same.

15. The combination of an overhead cabinet having tables beneath the same, cars within said cabinet for conveying edibles from the place of preparing the same, and means within said cabinet for engaging with said cars for stopping the same and for lowering said edibles onto said tables.

16. The combination of an overhead cabinet having tables beneath the same, cars within said cabinet for conveying edibles from the place of preparing the same, means within said cabinet for engaging with said cars for stopping the same and for lowering said edibles onto said tables, and doors above each of said tables and in the bottom of said cabinet adapted to automatically open and close to permit the edibles to be lowered onto said tables.

In testimony whereof, I, the said JAMES DOYLE, have hereunto set my hand.

JAMES DOYLE.

Witnesses:
T. B. HUMPHRIES,
J. N. COOKE.

---

Copies of this patent may be obtained for five cents each, by addressing the "Commissioner of Patents, Washington, D. C."